US005969884A

United States Patent [19]
Russell

[11] Patent Number: 5,969,884
[45] Date of Patent: Oct. 19, 1999

[54] PLACE KEEPER FOR LINE MAGNIFIER

[75] Inventor: Ian Russell, Hull, United Kingdom

[73] Assignee: Dal-Craft, Inc., Tucker, Ga.

[21] Appl. No.: 09/015,996

[22] Filed: Jan. 30, 1998

[51] Int. Cl.⁶ .................................................. G02B 27/02
[52] U.S. Cl. ......................... 359/802; 359/803; 359/804
[58] Field of Search ........................... 359/436, 440–442, 359/802–804

[56] References Cited

U.S. PATENT DOCUMENTS

| | | | |
|---|---|---|---|
| 3,704,938 | 12/1972 | Fanselow | 350/241 |
| 4,483,588 | 11/1984 | Dalbo et al. | 350/247 |
| 4,757,616 | 7/1988 | Hills | 33/488 |

*Primary Examiner*—Gregory Y Epps
*Assistant Examiner*—Michael A Lucas
*Attorney, Agent, or Firm*—James B. Middleton; Walter A. Rodgers

[57] ABSTRACT

A place keeper, for use with a straight edge for designating a row on a cross-stitch pattern, is slidable along the straight edge so the straight edge designates a row, and the place keeper designates a column. Two or more place keepers can be used to designate a group of columns, with one place keeper on each side of the columns to be designated. The straight edge is preferably a line magnifier having magnets at each end to hold the magnifier to a magnet board. The magnets may space the magnifier from the magnet board to allow the place keepers to slide without interference from the surface on which the magnifier is resting.

8 Claims, 1 Drawing Sheet

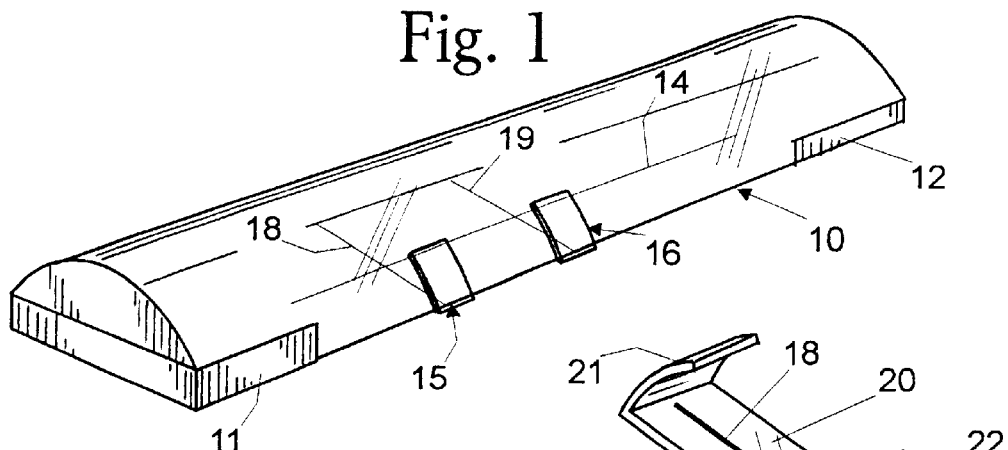
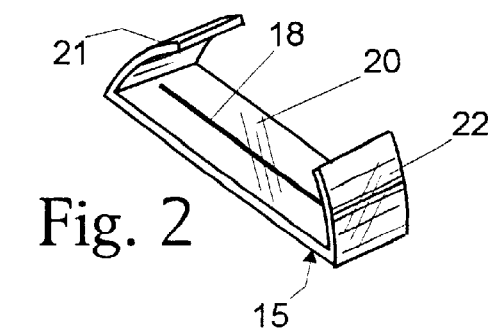
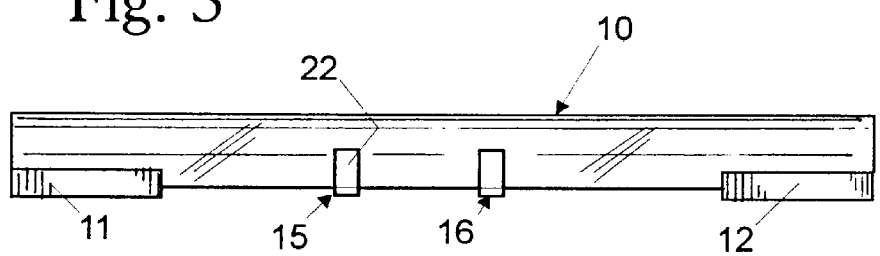
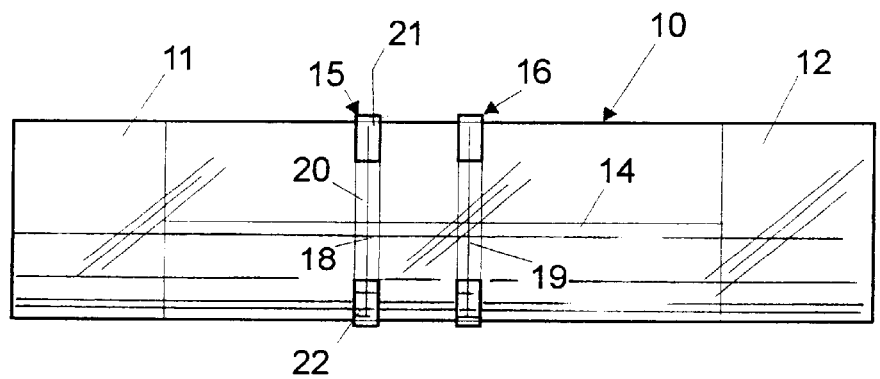

PLACE KEEPER FOR LINE MAGNIFIER

BACKGROUND OF THE INVENTION

1. Field of the Invention

This invention relates generally to line magnifiers for use in cross-stitch or the like, and is more particularly concerned with a line magnifier having at least one laterally movable place keeper.

2. Discussion of the Prior Art

In counted stitch cross-stitch, a person typically utilizes a straight edge to designate the row being worked on. Further, it is common to use a line magnifier having a line thereon for designating the row being worked on; and, the line magnifier shown in U.S. Pat. No. 4,483,588 has a line to indicate the row being worked on, and further includes magnets for holding the line magnifier to the magnet board. The line magnifier, or simply the straight magnet, as a device to designate a specific row, works quite well for designating the horizontal row, but there is nothing in the prior art to designate the particular column, or group of columns, the person is working on.

SUMMARY OF THE INVENTION

The present invention provides at least one place keeper that is movable laterally of a straight edge acting as a designator of a particular row of a cross-stitch pattern on which a person is working. In the preferred embodiment of the invention, the place keeper is in conjunction with a line magnifier having a horizontal line thereon for designating a row; and, the place keeper is movable laterally of the line magnifier, and has a vertical line thereon for designating a particular column. If desired, more than one of the place keepers may be used on one straight edge to designate both sides of one column, or a small number of columns.

BRIEF DESCRIPTION OF THE DRAWINGS

These and other features and advantages of the present invention will become apparent from consideration of the following specification when taken in conjunction with the accompanying drawings in which:

FIG. 1 is a perspective view of a line magnifier having place keepers made in accordance with the present invention mounted thereon;

FIG. 2 is a perspective view of a single place keeper made in accordance with the present invention;

FIG. 3 is a front elevational view of the apparatus shown in FIG. 1; and,

FIG. 4 is a top plan view of the apparatus shown in FIG. 1.

DETAILED DESCRIPTION OF THE EMBODIMENT

Referring now more particularly to the drawings, and to that embodiment of the invention here chosen by way of illustration, FIG. 1 illustrates a line magnifier generally designated at 10. The line magnifier 10 is substantially that shown in U.S Pat. No. 4,483,588 referred to above; thus, the line magnifier has magnets 11 and 12 at each end thereof for selectively holding the magnifier to a conventional magnet board or the like, and also includes a line 14 extending along the magnifier 10. It will be understood that the line 14 is visible when looking through the lens of the magnifier, so the line 14 will appear to be along a row on the graph being worked on. As a result, the magnifier 10 can be moved along a graph, and the line 14 can be placed at the row to be designated. The disclosure of U.S. Pat. No. 4,483,588 is incorporated herein by this reference, and will be hereinafter referred to as the '588 patent.

Between the two magnets 11 and 12 there are here shown two place keepers 15 and 16, each of the place keepers having a line thereon, the lines being designated at 18 and 19. The lines 18 and 19 extend generally perpendicularly to the line 14; and, the place keepers, hence the lines 18 and 19, will extend along columns while the line 14 extends along a row.

Attention is now directed to FIG. 2 for a more detailed discussion of the construction of the place keeper, here designated as the place keeper 15. The place keeper 15 comprises a base plate 20, and upwardly and inwardly curved arms 21 and 22 fixed at each end of the base plate 20. The arms 21 and 22 are preferably shaped substantially the same as the cross-sectional shape of the magnifier 10, but perhaps biased somewhat inward to provide a tight grip on the magnifier. These features of arms 21 and 22 allow place keeper 15 to slide on magnifier 10 while at the same time eliminating any slippage when the place keeper is positioned as desired to designate a column.

Centrally of the base plate 20, there is the line 18, which extends parallel to the elongated sides of the base plate. It will be understood that the base plate 20 is rectangular, so the arms 21 and 22 will hold the base plate, and the line 18, perpendicular to the magnifier 10 and the line 14.

Looking at FIG. 3 of the drawings, it will be seen that the place keepers 15 and 16 are mounted on the line magnifier 10 between the magnets 11 and 12. It will also be realized that the '588 patent discloses the magnifier having magnets such as the magnets 11 and 12 coplanar with the bottom of the magnifier. For purposes of the present invention, however, it is preferable that the magnets 11 and 12 extend somewhat below the lower surface of the magnifier 10 as is shown in FIG. 3. This provides clear space for the place keepers 15 and 16 to slide along the line magnifier 10 without interference, and without the necessity of picking up the magnifier each time the position of the place keepers is to be changed. Those skilled in the art will realize that the distance from the lower surface of the magnifier to the graph being worked on should be minimal to minimize the parallactic error, but should be just sufficient to allow sliding of the place keepers.

With the above discussion in mind, attention is directed to FIG. 4 of the drawings. This figure shows the magnifier from generally the perspective that a user would have. The magnifier 10 would be fixed to a magnet board or the like, held thereto by the magnets 11 and 12. Between the magnets 11 and 12, one would view the graph being worked on, and can see the horizontal line 14 in conjunction with the graph. Thus, the line 14 will be placed, usually, at the bottom of the row being worked on. The two place keepers 15 and 16 are movable longitudinally of the magnifier, and longitudinally of the line 14, so the place keepers 15 and 16 can be placed on the magnifier so that the lines 18 and 19 are adjacent to selected columns being worked on.

Those skilled in the art will understand that one may wish to designate a particular area of a graph that requires one color. In this case, the line 14 of the magnifier can designate the row, and the lines 18 and 19 on the place keepers 15 and 16 can designate the first and last column of the group being worked on. Also, a person may wish to have means for designating where the person stopped work, and a single place keeper 15 may be used, the junction of the line 14 and the line 18 (for example) designating the stopping place.

Those skilled in the art will determine many techniques to produce the place keeper of the present invention. Since the devices are preferably made of a polymeric material, they may be injection molded or the like. One technique that has been found to be economical and effective is to print the line, such as the lines 18 and 19, on a sheet of material, then die cut the sheet, leaving the individual pieces attached by small tits. A plurality of pieces can then be heated and formed around a mold member. The plurality of pieces can be removed after cooling, and the individual pieces pulled apart. The pieces are preferably made of a somewhat elastic material such a polyolefin, polyester, nylon or the like, so the arms 21 and 22 are easily snapped around the magnifier.

It will therefore be seen that the present invention provides means for designating a particular place on a graph, the place keeper to be used in conjunction with a straight edge that designates a specific row. The place keeper of the present invention designates a specific column; and, if desired, a plurality of the place keepers may be used to designate both sides of a group of columns being worked on.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

What is claimed as invention is:

1. In a line magnifier having a flat bottom surface and a cylindrically shaped upper surface for magnifying a row of printed material, said magnifier including a line along the bottom surface thereof, the combination therewith of at least one place keeper slidably received on said magnifier and comprising a base plate in flat face contacting relation with said bottom surface of said magnifier, and said base plate including a line disposed perpendicularly to said line along the bottom surface of said magnifier and in a plane adjacent to said bottom surface.

2. The combination as claimed in claim 1, wherein said magnifier further includes magnets at each end thereof for holding said magnifier to a surface having said printed material thereon, said magnets extending below said bottom surface of said magnifier to cause a space between said printed material and said bottom surface, said base plate of said place keeper being disposed within said space between said printed material and said bottom surface.

3. The combination as claimed in claim 2, wherein said at least one place keeper comprises a plurality of place keepers.

4. The combination as claimed in claim 1, wherein said place keeper comprises a pair of arms extending upwardly from said base plate for engaging said magnifier.

5. The combination as claimed in claim 4, wherein said arms are shaped substantially the same as the cross-sectional shape of said upper surface.

6. The combination as claimed in claim 4, wherein said arms are biased inwardly with respect to said magnifier.

7. In a line magnifier having a flat bottom surface and a cylindrically shaped upper surface for magnifying a row of printed material, said magnifier including a line along the bottom surface thereof, the combination therewith of at least one place keeper slidably received on said magnifier, said place keeper including a line disposed perpendicularly to said line along the bottom surface of said magnifier and in a plane adjacent to said bottom surface, said magnifier including magnets at each end thereof for holding said magnifier to a surface having said printed material thereon, said magnets extending below said bottom surface of said magnifier to cause a space between said printed material and said bottom surface, and said base plate of said place keeper being disposed within said space between said printed material and said bottom surface.

8. The combination as claimed in claim 7, wherein said at least one place keeper comprises a plurality of place keepers.

\* \* \* \* \*